United States Patent
Jewell et al.

(10) Patent No.: US 10,084,355 B2
(45) Date of Patent: Sep. 25, 2018

(54) ELECTRICAL MACHINES

(71) Applicant: ROLLS-ROYCE PLC, London (GB)

(72) Inventors: Geraint W Jewell, Sheffield (GB); Ellis F H Chong, Derby (GB); Maurice Shortte, Sheffield (GB)

(73) Assignee: ROLLS-ROYCE plc, London (GB)

( * ) Notice: Subject to any disclaimer, the term of this patent is extended or adjusted under 35 U.S.C. 154(b) by 236 days.

(21) Appl. No.: 15/190,717

(22) Filed: Jun. 23, 2016

(65) Prior Publication Data

US 2017/0025911 A1  Jan. 26, 2017

(30) Foreign Application Priority Data

Jul. 20, 2015  (GB) .................................. 1512663.4

(51) Int. Cl.
*H02K 9/19* (2006.01)
*H02K 5/20* (2006.01)
(Continued)

(52) U.S. Cl.
CPC .................. *H02K 3/24* (2013.01); *H02K 5/20* (2013.01); *H02K 9/197* (2013.01)

(58) Field of Classification Search
CPC ............ H02K 5/00; H02K 5/16; H02K 5/167; H02K 5/1672; H02K 5/17; H02K 5/173; H02K 5/1732; H02K 5/20; H02K 9/00; H02K 9/005; H02K 9/10; H02K 9/19; H02K 9/197; H02K 9/24; H02K 3/24
See application file for complete search history.

(56) References Cited

U.S. PATENT DOCUMENTS 3,716,732 A * 2/1973 Tillma ................. H02K 5/1672
310/61
4,442,371 A * 4/1984 Utsunomiya ............ H02K 9/00
310/260
(Continued)

FOREIGN PATENT DOCUMENTS

EP   2 159 906 A2   3/2010
EP   2 760 113 A1   7/2014
(Continued)

OTHER PUBLICATIONS

Oct. 12, 2016 European Search report issued in Patent Application No. EP16175720.
(Continued)

*Primary Examiner* — Tran Nguyen
(74) *Attorney, Agent, or Firm* — Oliff PLC (57) ABSTRACT

An electrical machine is disclosed comprising a stator cavity. The stator cavity is axially divided by a distribution plate into a winding chamber containing stator windings of the electrical machine and a handling chamber. The handling chamber has one of a fluid inlet and a fluid outlet and the winding chamber has the other of the fluid inlet and fluid outlet. In use fluid is passed from the fluid inlet to the fluid outlet via the handling chamber, the winding chamber and an array of fluid passages in the distribution plate providing fluid communication between the handling chamber and winding chamber. The array of fluid passages comprises passages of at least two different cross-sectional areas.

11 Claims, 5 Drawing Sheets

(51) Int. Cl.
*H02K 3/24* (2006.01)
*H02K 9/197* (2006.01)

(56) References Cited

U.S. PATENT DOCUMENTS

| | | | | |
|---|---|---|---|---|
| 5,616,973 | A * | 4/1997 | Khazanov | H02K 5/20 |
| | | | | 310/54 |
| 2010/0264760 | A1* | 10/2010 | Matsui | H02K 3/24 |
| | | | | 310/54 |
| 2011/0156508 | A1* | 6/2011 | Minemura | H02K 9/193 |
| | | | | 310/54 |
| 2011/0180239 | A1* | 7/2011 | Sugimoto | H02K 3/24 |
| | | | | 165/104.33 |
| 2011/0181136 | A1* | 7/2011 | Nakamori | H02K 1/20 |
| | | | | 310/54 |
| 2011/0316367 | A1* | 12/2011 | Takahashi | H02K 3/24 |
| | | | | 310/54 |
| 2014/0217842 | A1* | 8/2014 | Kikuchi | H02K 9/19 |
| | | | | 310/54 |

FOREIGN PATENT DOCUMENTS

| | | |
|---|---|---|
| GB | 2509738 A | 7/2014 |
| JP | 2004-072812 A | 3/2004 |
| JP | 2009-089513 A | 4/2009 |
| JP | 2010-130794 A | 6/2010 |
| JP | 2011135698 A * | 7/2011 ............ H02K 9/193 |

OTHER PUBLICATIONS

Feb. 1, 2016 Great Britain Search Report issued in Patent Application No. GB1512663.4.

Aug. 18, 2017 Office Action issued in European Patent Application No. 16175720.8.

* cited by examiner

ELECTRICAL MACHINES

In general terms the present disclosure concerns electrical machines. More specifically the present disclosure concerns electrical machines themselves, stator sleeves and methods of regulating fluid flow to a stator of an electrical machine. The invention may have particular utility in increasing cooling fluid flow uniformity through a stator and may therefore reduce the incidence and/or severity of hot spots within the stator.

The stator of electrical machines is heated during operation as a result of magnetic and electrical losses. In order to preserve the stator, and in particular its insulation, the stator may be fluid cooled. In the case of high power density electric machines a liquid coolant is typically used. The fluid coolant is passed through a winding chamber, preferably flooding the area around the windings of the stator. Where however there is non-uniformity in the fluid flow and/or penetration around the windings, areas may be inadequately cooled, resulting in potentially damaging hot-spots.

According to a first aspect there is provided an electrical machine optionally comprising a stator cavity, the stator cavity optionally being axially divided by a distribution plate into a winding chamber containing stator windings of the electrical machine and a handling chamber, the handling chamber optionally having one of a fluid inlet and a fluid outlet and the winding chamber optionally having the other of the fluid inlet and fluid outlet, whereby in use fluid is optionally passed from the fluid inlet to the fluid outlet via the handling chamber, the winding chamber and an array of fluid passages in the distribution plate providing fluid communication between the handling chamber and winding chamber and where further the array of fluid passages optionally comprises passages of at least two different cross-sectional areas. The distribution plate may serve to even out fluid flow through the winding chamber and around the stator windings. Specifically the distribution plate may provide mitigation for a basic electrical machine design in which the fluid, taking the path of least resistance, tends to bypass areas of the winding chamber in favour of alternative routes there through. It may be for instance that without the distribution plate the fluid tends to flow directly between the fluid inlet and outlet without a desirable degree of distribution throughout the winding chamber. The distribution plate may create a pressure differential at different locations within the stator cavity, reducing flow that would otherwise occur along preferred fluid flow paths and increasing it elsewhere. Where the fluid is used to cool the stator windings, the distribution plate may therefore reduce or prevent the formation of 'hot-spots' in the stator windings.

In some embodiments the passages provide the only fluid communication paths between the handling and winding chambers. This may ensure that the effectiveness of the distribution plate is not compromised by alternative fluid leakage paths between the chambers.

In some embodiments the stator cavity is annular. The distribution plate may also be annular and may span the stator cavity in a substantially radial direction. In such arrangements the distribution plate may in particular improve circumferential distribution of fluid flow through the winding chamber.

In some embodiments the cross-sectional area of the fluid passages increase from a minimum at the bottom of the distribution plate to a maximum at the top of the distribution plate. As will be appreciated 'top' in the context of this embodiment means top with respect to the normal orientation of the electrical machine in use. It may be that under the influence of gravity, fluid tends to preferentially flow through the winding chamber towards its bottom. By increasing the resistance to such lower flow paths by comparison with the resistance to higher flow paths, a more favourable flow distribution may be attained.

In some embodiments there is only one fluid inlet. There may additionally or alternatively be only one fluid outlet. Whilst a single fluid inlet and/or outlet may be advantageous in that it may save space, weight and complexity by comparison with alternatives (such as a manifold inlet and/or outlet), it may also tend to decrease fluid flow distribution uniformity through the winding chamber. Use of the distribution plate may address this tendency.

In some embodiments the fluid inlet is provided at a particular circumferential position and the cross-sectional area of the fluid passages increase with increased circumferential disparity of the passage position relative to that of the fluid inlet. The increase may be in a step-wise manner or alternatively in a relatively smooth graduation between a maximum and a minimum cross-sectional area.

In some embodiments the fluid outlet is provided at a circumferential position having substantially the maximum possible circumferential divergence from that of the fluid inlet. Such relative positioning of the fluid inlet and outlet may tend to increase the uniformity of the fluid flow distribution through the winding chamber.

In some embodiments the fluid inlet and outlet are provided at substantially opposed axial ends of the stator cavity. Such relative positioning of the fluid inlet and outlet may tend to increase the uniformity of the fluid flow distribution through the winding chamber.

In some embodiments the electrical machine further comprises a rotor chamber separated from and sealed with respect to the stator cavity by a stator sleeve. The stator sleeve may for instance be substantially cylindrical and the rotor chamber provided radially inward of the stator cavity. The stator sleeve may prevent the fluid contained in the stator cavity from passing into the rotor cavity. It may also prevent stator winding exposure to a working fluid present, in use, within the rotor cavity. As will be appreciated exposure of the stator windings to the working fluid may in some instances be detrimental to stator winding longevity, performance and/or maintainability.

In some embodiments the distribution plate is integrally formed with the stator sleeve. The integrally formed distribution plate may increase the rigidity and strength of the stator sleeve. This may reduce the likelihood of stator sleeve failure and may additionally or alternatively allow for a thinner stator sleeve. A thinner stator sleeve may advantageously allow for a decrease in its influence on the main working air gap of the electrical machine and so an increase in the flux density and electrical machine performance. Integral forming of the distribution plate and stator sleeve may also improve sealing performance between the handling chamber and winding chamber.

In some embodiments slot wedges for retaining the stator windings are integrally formed with the stator sleeve. Such integral slot wedges may further strengthen the stator sleeve, may be less prone to failure and/or may be thinner (thus allowing an increase in flux density in the main working air gap).

In some embodiments the fluid inlet is to the handling chamber and the fluid outlet is from the winding chamber. Thus in use, fluid is delivered to the handling chamber by the fluid inlet, before passing through the passages of the distribution plate and into the winding chamber and finally exiting via the fluid outlet. A configuration in which fluid must pass through the distribution plate before entering the winding chamber (rather than in order to exit it) may mean that uniformity of fluid flow through the winding chamber is achieved more quickly upon initiation of fluid flow.

In some embodiments baffles extend from the distribution plate in a substantially axial direction into the winding chamber. The baffles may extend for only a proportion of the axial extent of the winding chamber (they may for instance extend for all or some of the distance between the distribution plate and the stator windings). The baffles may help to reduce circumferential flow of fluid immediately downstream of the distribution plate which might otherwise at least partially reduce the advantage potentially offered by the distribution plate. The baffles may also serve to prevent rotation of the distribution plate, which might otherwise occur as a consequence of pressure differential caused by the difference in the cross-sectional areas of the fluid passages.

In some embodiments the fluid is liquid.

According to a second aspect there is provided a stator sleeve in accordance with the first aspect.

According to a third aspect there is provided a method of regulating fluid flow to stator windings of an electrical machine, the electrical machine optionally comprising a winding chamber containing the stator windings, the method comprising:

Optionally providing different flow area restriction for fluid flow through the winding chamber at different locations, optionally lessor flow area being provided at locations where, in use, fluid supply pressure would otherwise be higher and greater flow area where it would otherwise be lower.

In some embodiments the winding chamber is annular and the different locations are circumferentially distinct.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

As a preliminary point it is noted that references throughout this specification to axial and radial directions are intended in the conventional sense with reference to the main rotational axis of an electrical machine and directions perpendicular to that main rotational axis respectively.

Figure 1:
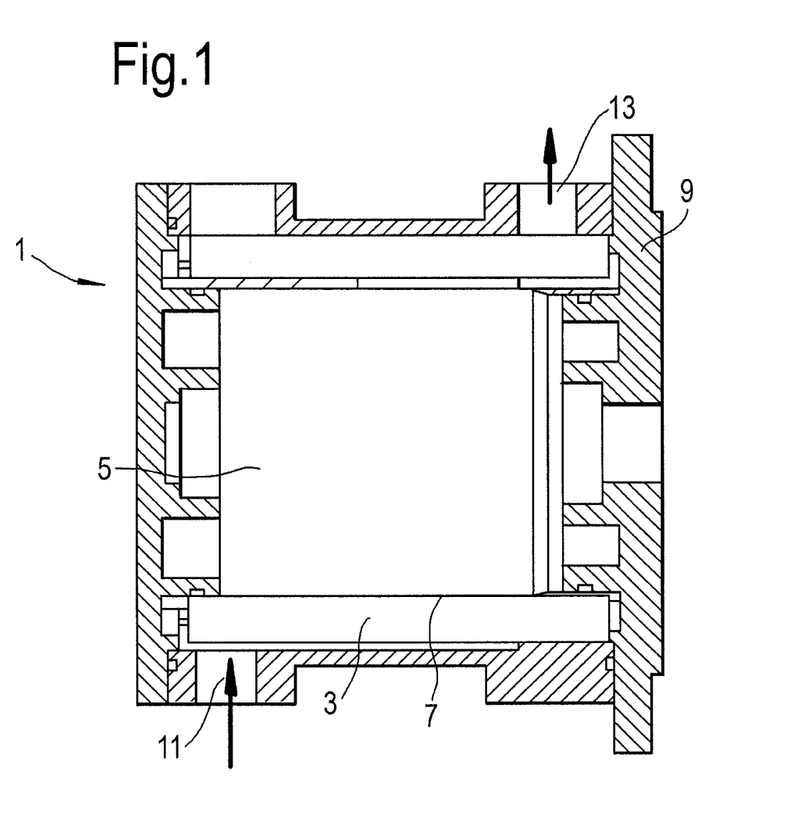
FIG. 1 is a cross-sectional view of a conventional electrical machine.

Referring first to FIG. 1 a conventional electrical machine 1 is shown in cross-section. The electrical machine 1 comprises an annular winding chamber 3 surrounding and co-axial with a rotor chamber 5. The rotor chamber 5 contains a rotor (not shown). A stator sleeve 7 is provided between the winding chamber 3 and the rotor chamber 5, sealing each from the other. Stator windings (not shown), contained within the winding chamber, are retained by a stator core (not shown). An electrical machine casing 9 surrounds the winding chamber 3 and defines the electrical machine radially outer and side walls.

The winding chamber 3 is arranged in use to be flooded with coolant fluid. The fluid surrounds and cools the stator windings (not shown) provided in the winding chamber 3. The fluid is pumped into the winding chamber 3 via a single fluid inlet 11 passing through the casing 9 in a radial direction. The fluid passes through the winding chamber 3, cooling the stator windings, before leaving the winding chamber 3 via a single fluid outlet 13. The fluid outlet 13 passes through the casing 9 in a radial direction. The fluid inlet 11 and outlet 13 are provided at opposite axial ends of the winding chamber 3. The fluid inlet 11 and outlet 13 are further provided at relative circumferential positions having the maximum possible circumferential divergence from one another (that is, despite being axially displaced with respect to one another, they are opposite one another from a circumferential perspective).

When the electrical machine 1 is operated, the fluid cools the stator windings. Nonetheless the distribution of the fluid as it is pumped through the winding chamber 3 is non-uniform and consequently hot-spots tend to occur within the stator windings. The circumferential divergence of the fluid inlet 11 and outlet 13 tends to improve the uniformity of fluid flow through the winding chamber 3, but this is only partially effective.

Figure 2:
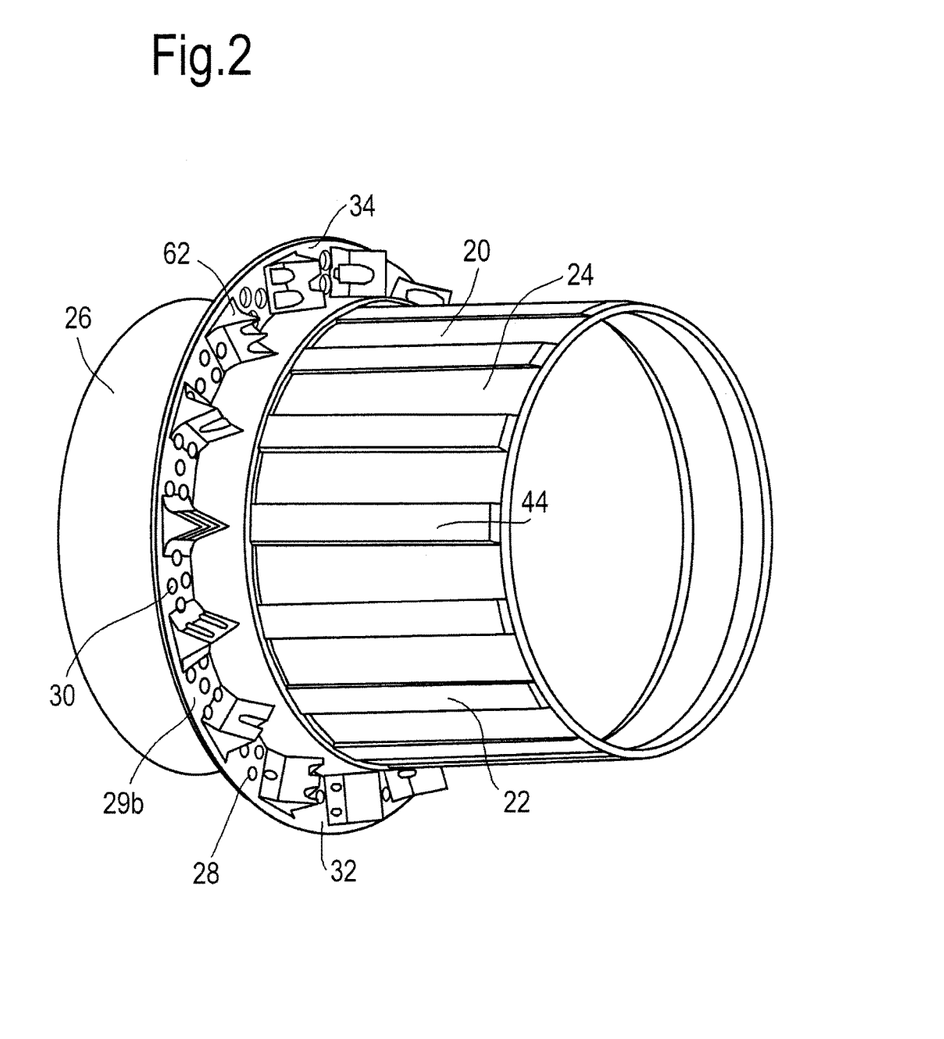
FIG. 2 is a perspective view of a stator sleeve in accordance with embodiments of the invention.

Referring now to FIG. 2 a stator sleeve 20 of an electrical machine is shown. The stator sleeve 20 is substantially cylindrical and comprises a plurality of integrally formed and uniformly distributed slot wedges 22 about an axially rearward outer circumferential surface 24. Adjacent the axially rearward outer circumferential surface 24 is an axially forward outer circumferential surface 26. Extending radially outward from the axially forward outer circumferential surface 26 is an annular distribution plate 28 formed integrally with the stator sleeve 20. The distribution plate 28 has an upstream surface 29a and a downstream surface 29b.

Figure 3:
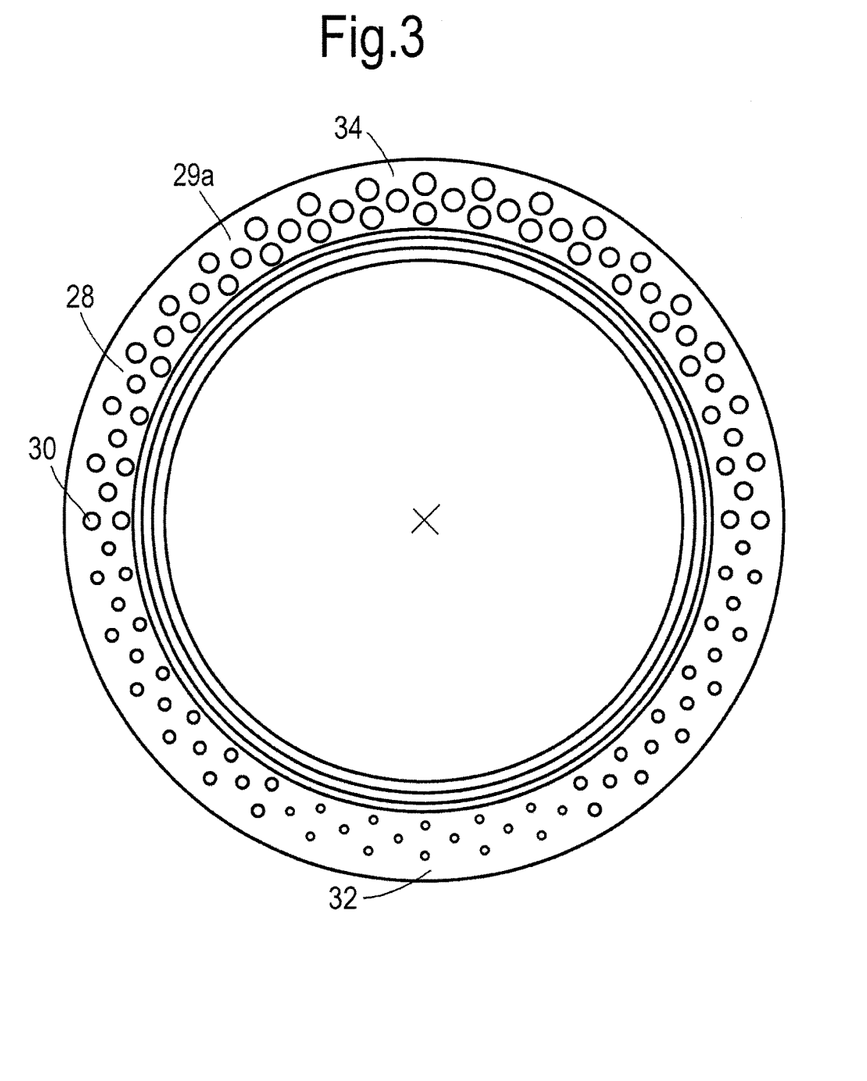
FIG. 3 is a side view of a distribution plate in accordance with embodiments of the invention.

As best seen with reference to FIGS. 2 and 3, the distribution plate 28 comprises an array of fluid passages 30 passing there through in an axial direction. The fluid passages 30 are of mixed cross-sectional area. Specifically the passages having the minimum cross-sectional area of all the fluid passages 30 are located at the bottom 32 of the distribution plate 28 and those with the maximum cross-sectional area are located at the top 34. The remaining fluid passages in the array have cross-sectional areas ever increasing in size from the bottom 32 to the top 34 of the distribution plate 28. The cross-sectional areas of the remaining fluid passages therefore graduate relatively smoothly between the fluid passages having the minimum and maximum cross-sectional areas.

Figure 4:
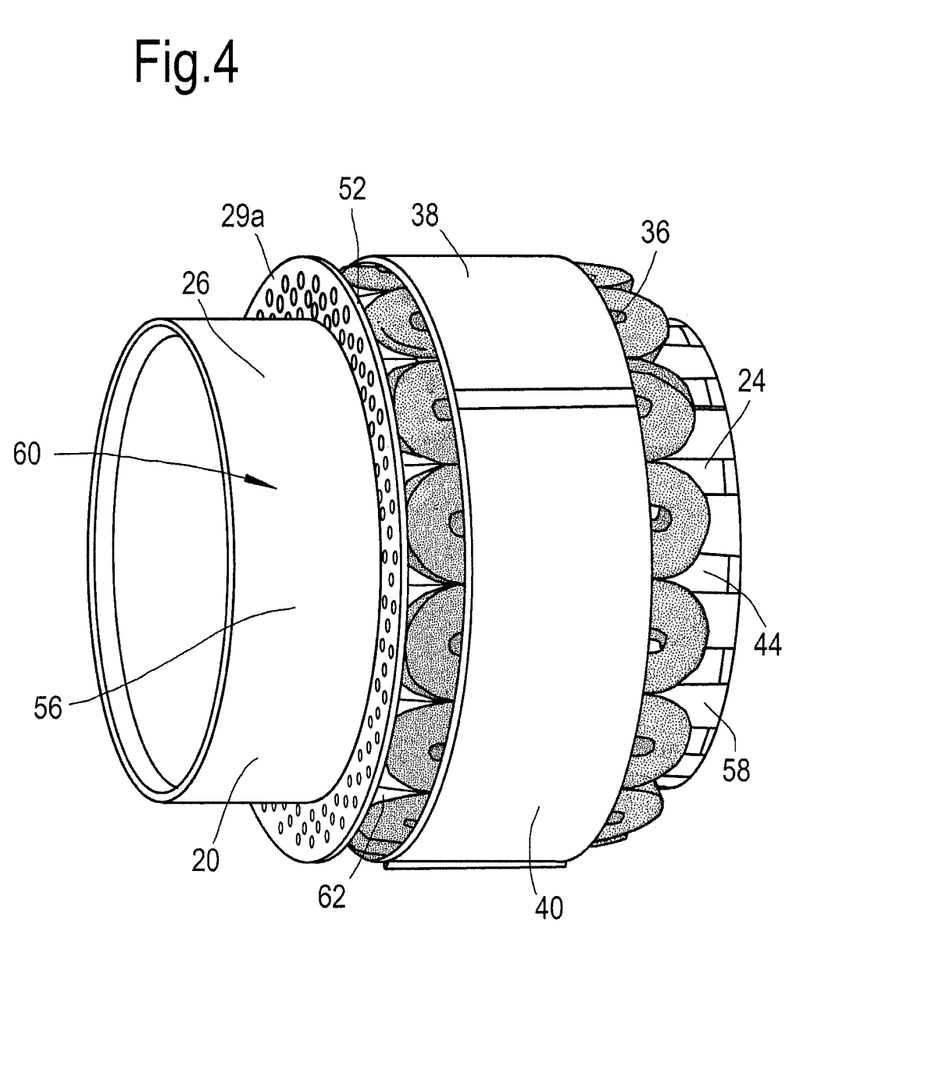
FIG. 4 is a perspective view of a stator sleeve with assembled stator core in accordance with embodiments of the invention.

Referring now to FIG. 4, the stator sleeve 20 is shown with installed stator windings 36 and an installed stator core 38. The stator windings 36 are installed about the axially rearward outer circumferential surface 24 of the stator sleeve 20. The stator core 38 has a cylindrical portion 40, radially outwards of and surrounding the stator windings 36. The stator core 38 also has a plurality of legs (not shown) which extend radially inwards from the cylindrical portion 40, with each leg separating adjacent stator windings 36. Teeth (not shown), one extending in each circumferential direction from the radially inner end of each leg, are engaged with a corresponding circumferentially rebated portion radially inwards from a top surface 44 of each slot wedge 22. The teeth retain the stator core 38 and therefore the stator windings 36 with respect to the stator sleeve 20. The arrangement further allows for the stator core 38 and stator windings 36 to be slid axially with respect to the stator sleeve 20 in order to engage them therewith. With the stator core 38 and stator sleeve 20 engaged, the slot wedges 22 assist in retaining the stator windings 36 in a radial sense.

Figure 5:
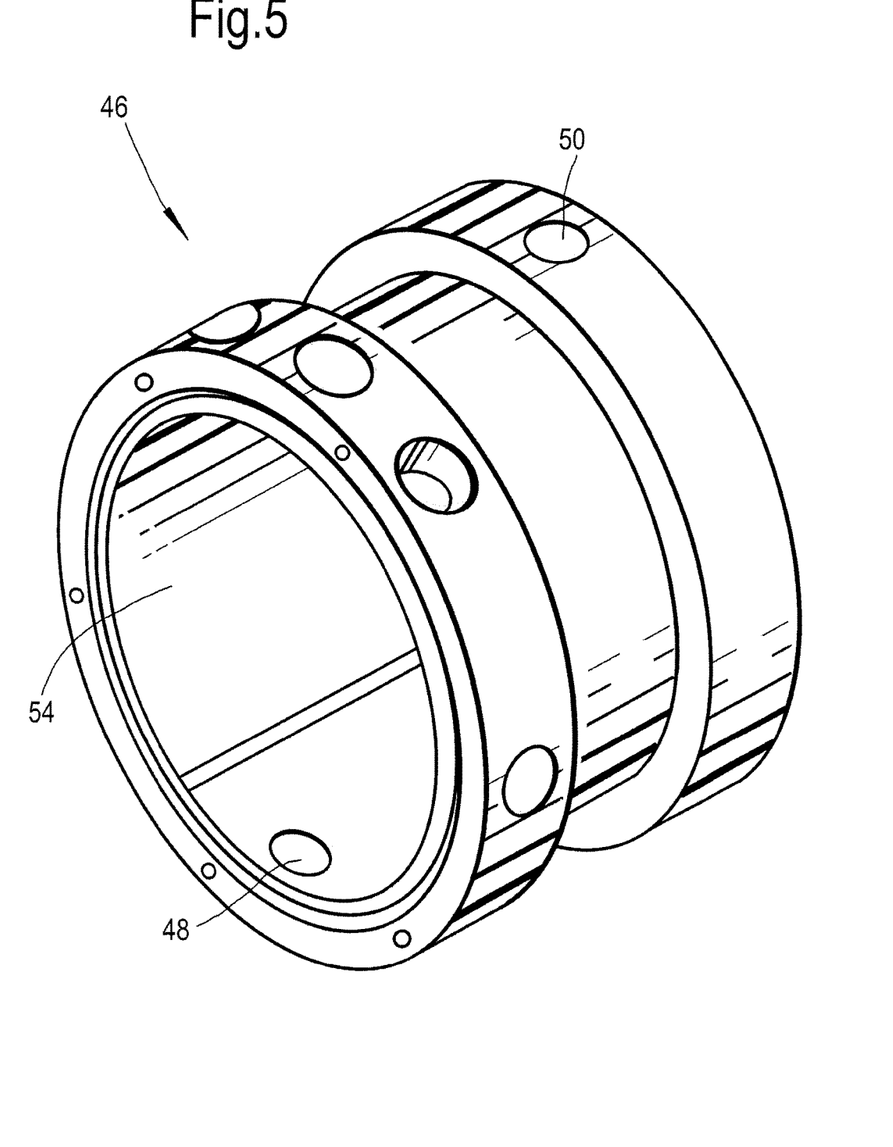
FIG. 5 is perspective view of an electrical machine casing in accordance with embodiments of the invention.

Referring now to FIG. 5 an electrical machine casing is generally shown at 46. For clarity, end plates of the casing 46 are not shown, but would be provided with the electrical machine in an assembled configuration. The casing 46 is substantially cylindrical and is dimensioned such that the stator sleeve 20 with installed stator windings 36 and stator core 38 are locatable within the casing 46. The casing 46 is provided with a single fluid inlet 48 and a single fluid outlet 50. Each of the fluid inlet 48 and outlet 50 pass through the casing 46 in a radial direction. The fluid inlet 48 and outlet 50 are provided at opposite axial ends of the casing 46. The fluid inlet 48 and outlet 50 are further provided at relative circumferential positions having the maximum possible circumferential divergence from one another (that is, despite being axially displaced with respect to one another, they are opposite one another from a circumferential perspective).

When the stator sleeve 20 with installed stator windings 36 and stator core 38 are installed within the casing 46, a radially outer surface 52 of the distribution plate 28 abuts a radially inner surface 54 of the casing 46. A seal is provided between the radially outer surface 52 and the radially inner surface 54. The fluid inlet 48 is in fluid communication with a handling chamber 56 defined between the upstream surface 29a of the distribution plate 28, the inner surface 54 of the casing 46, the stator sleeve 20 and a first end plate (not shown) of the casing 46. The fluid outlet 50 is in fluid communication with a winding chamber 58 in which the stator windings 36 and stator core 38 are located. The winding chamber 58 is defined between the downstream surface 29b of the distribution plate 28, the inner surface 54 of the casing 46, the stator sleeve 20 and a second end plate (not shown) of the casing 46. Together the handling chamber 56 and winding chamber 58 constitute an annular stator cavity generally provided at 60. The stator cavity 60 is radially outwards of a rotor chamber 62 provided radially inwards of the stator sleeve 20. The fluid inlet 48 and outlet 50 are provided at substantially opposed axial ends of the stator cavity 60, adjacent respectively the first and second end plates (not shown).

A further feature of the distribution plate 28 not previously mentioned is a plurality of baffles 62 extending in a substantially axial direction from the downstream surface 29b into the winding chamber 58. The baffles 62 are uniformly circumferentially distributed about the downstream surface 29b and the radial extent of each baffle 62 is radially aligned. Each baffle is positioned so as it is aligned with and is further shaped so as to complement an interface between two windings 36.

In the installed condition described above, the fluid passages 30 provide the only fluid communication paths between the handling chamber 56 and the winding chamber 58. Further the passages having the smallest cross-sectional area are substantially circumferentially aligned with the fluid inlet 48 (and therefore substantially circumferentially opposite the fluid outlet 50). The passages having the greatest cross-sectional area are substantially circumferentially aligned with the fluid outlet 50 (and are therefore substantially circumferentially opposite the fluid inlet 48).

With the stator sleeve 20, stator windings 36, stator core 38 and a rotor (not shown) installed within the casing 46 and the end plates of the casing installed, an electrical machine is provided. In operation of the electrical machine the windings 36 are cooled by a liquid coolant. The liquid coolant is pumped into the bottom of the handling chamber 56 via the fluid inlet 48. Towards the bottom of the handling chamber 56, the passages 30 have a relatively small cross-sectional area and so present a significant flow restriction to the liquid coolant. This reduces the quantity of liquid coolant that passes through the passages 30 and into the winding chamber 58. At higher levels within the handling chamber 56 the cross-sectional area of the passages 30 gets ever larger and so the restriction to the flow of coolant correspondingly diminishes. Nonetheless at ever higher positions within the handling chamber the coolant pressure also diminishes. The effect of the distribution plate 28 is to therefore make the liquid coolant flow entering the winding chamber 58 via the passages 30 more uniform.

This in turn may improve the uniformity of the cooling delivered to the various windings 36 and so a reduction in the formation of hot-spots.

Once the coolant liquid has passed through the passages 30 the baffles 62 serve to inhibit significant circumferential migration of the cooling liquid before it reaches the windings 36. In this way the impact of the distribution plate 28 in creating a more uniform cooling liquid flow may be better preserved.

Once the cooling liquid has passed through the windings 36 it exits the winding chamber 58 via the fluid outlet 50 and is passed through a refrigeration circuit so as the heat energy acquired from the windings 36 may be removed and the liquid coolant re-used. The positioning of the fluid outlet 50 (circumferentially opposed to the fluid inlet 48 and at the opposite axial extent of the stator cavity from the fluid inlet 48) serves to further increase liquid coolant flow uniformity, reducing the potential for flow 'short-circuiting' of areas of the winding chamber 58.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An electrical machine comprising: a stator cavity, the stator cavity being axially divided by a distribution plate into a winding chamber containing stator windings of the electrical machine and a handling chamber, the handling chamber having a fluid inlet and the winding chamber having a fluid outlet, thereby in use fluid is passed from the fluid inlet to the fluid outlet via the handling chamber, the winding chamber and an array of fluid passages in the distribution plate providing fluid communication between the handling chamber and winding chamber, and wherein the array of fluid passages comprises passages of at least two different cross-sectional areas, and the distribution plate further comprises baffles extending therefrom in a substantially axial direction into the winding chamber, wherein each of the baffles is aligned with an interface between two stator windings, and said each of the baffles is shaped such that complement the interface, so as to reduce circumferential flow of fluid immediately downstream of the distribution plate, and to prevent rotation of the distribution plate.

2. An electrical machine according to claim 1 wherein the passages provide the only fluid communication paths between the handling and winding chambers.

3. An electrical machine according to claim 1 wherein the cross-sectional area of the fluid passages increase from a minimum at the bottom of the distribution plate to a maximum at the top of the distribution plate.

4. An electrical machine according to claim 1 wherein the stator cavity and distribution plate are annular and the distribution plate spans the stator cavity in a substantially radial direction.

5. An electrical machine according to claim 4 wherein the fluid outlet is provided at a circumferential position having substantially the maximum possible circumferential divergence from that of the fluid inlet.

6. An electrical machine according to claim 4 wherein the fluid inlet is provided at a particular circumferential position and the cross-sectional area of the fluid passages increase with increased circumferential disparity of the passage position relative to that of the fluid inlet.

7. An electrical machine according to claim 1 wherein there is only one fluid inlet and only one fluid outlet.

8. An electrical machine according to claim 1 wherein the fluid inlet and outlet are provided at substantially opposed axial ends of the stator cavity.

9. An electrical machine according to claim 1 further comprising a rotor chamber separated from and sealed with respect to the stator cavity by a stator sleeve.

10. An electrical machine according to claim 9 wherein the distribution plate is integrally formed with the stator sleeve.

11. An electrical machine according to claim 9 wherein slot wedges for retaining the stator windings are integrally formed with the stator sleeve.

* * * * *